June 13, 1944.  R. L. LAY ET AL  2,351,524

METHOD OF SEISMIC PROSPECTING

Filed May 23, 1942

R.L. LAY
B.H. TREYBIG, JR.
L.M. HUBBY
INVENTORS

BY R.J. Dearborn

THEIR ATTORNEY

Patented June 13, 1944

2,351,524

UNITED STATES PATENT OFFICE 2,351,524

METHOD OF SEISMIC PROSPECTING

Roy Livingston Lay, Bernhardt Henry Treybig, Jr., and Laurence M. Hubby, Houston, Tex., assignors to Texaco Development Corporation, New York, N. Y., a corporation of Delaware Application May 23, 1942, Serial No. 444,290

3 Claims. (Cl. 181—0.5)

This invention relates to an improvement in the seismic method of exploring the subsurface strata of the earth and more particularly to a method of locating strata, part or all of which may be beneath a body of water. An explosive charge or "shot" is fired below the surface of the water and some of the seismic waves which are thereby generated pass into the earth and are reflected from, or refracted through, various strata to one or more vibration detectors connected to suitable amplifying and recording equipment. The principal object of the invention is to provide a method by means of which sharp and distinct records may be obtained.

In seismic prospecting or exploration the record which is usually made by means of an oscillograph on a moving strip of film should provide a sharp clear indication of the arrival at the detector of the primary or P waves generated by the explosion. It has been found, however, that when the charge or shot is fired in a body of water, such as in a lake or inland bay, very strong secondary P waves are found to arrive at the same velocity as the primary waves, each set of P waves being accompanied by a train of reflected waves, with the result that two or more records are superimposed upon each other thus rendering the validity of any reflection doubtful.

It has been found that when the shot is fired at a depth such that there is no "blow-out" of the water above the explosion the secondary P waves are almost always present causing the record to be indistinct, as has been pointed out above. However, when the size of the charge and the depth at which the charge is exploded are so proportioned that the water above the charge will be blown out by the explosion, the annoying secondary P waves are not present.

It is believed that the unwanted secondary P waves are caused by the collapse of the cavity formed in the water when the explosion takes place at such a depth that there is no blow-out above the charge, and also by the compression and expansion of the gas released by the shot as this gas rises to the surface. The train of waves thus set up by the collapse of the cavity and the movement of the gas travels with substantially the same velocity as the primary P waves and thus causes two or more records to be superimposed upon each other so as to render the record indistinct. After considerable experimentation a curve has been developed in which the cube root of the charge in pounds has been plotted against the depth in feet to which the charge may be placed in the water so as to utilize all possible energy of the shot while at the same time eliminating the secondary P waves.

In accordance with the invention a method is provided by means of which a charge of substantially any weight may be fired at such a depth that the secondary P waves will be eliminated while at the same time the maximum energy of the explosion may be used to generate the desired primary waves. If, of course, the charge is exploded at a very shallow depth, the water above the explosion will naturally be blown upwardly, but in this case much of the energy of the explosion may be dissipated before it reaches the solid earth beneath the body of water, so that the record obtained may be so weak that deep reflections will not be noted.

For a better understanding of the invention reference may be had to the accompanying drawing in which.

Figure 2:
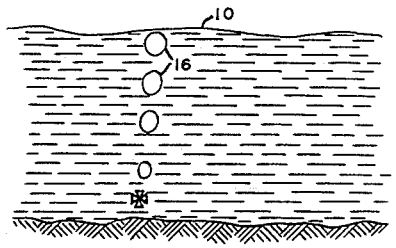
Figure 2 illustrates the gas bubbles passing to the surface after the explosion.

Referring to the drawing, a body of water is illustrated at 10 and a charge of explosive 12 is shown as having just been detonated. The explosion of the charge 12 causes a cavity 14 to be formed in the water, and, as is illustrated, the charge has been placed so deep in the water that the water above the charge has not been blown out by the explosion. The cavity 14 immediately collapses and the gas from the explosion rises through the water to the surface, as is indicated by the bubbles 16 in Figure 2. This collapse of the cavity and the attendant passage of the gas bubbles causes the unwanted secondary P waves which follow the primary P waves almost instantly, and the arrival of the two sets of waves at the detector at almost the same time causes at least two records to be superimposed over each other on the record strip.

Figure 1:
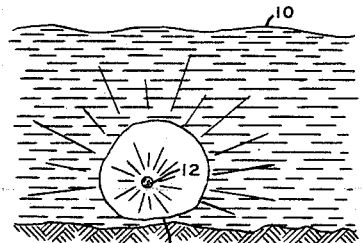
Figure 1 is a vertical section illustrating diagrammatically the explosion of a charge of such weight and at such a depth that a cavity will be caused without a consequent blow-out of the water above the explosion.
Figure 3:
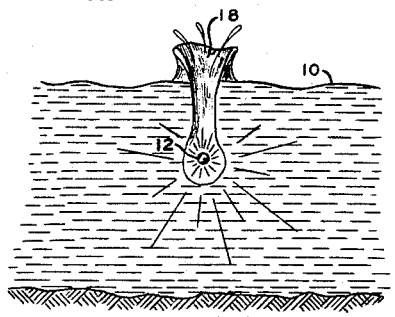
Figure 3 illustrates the explosion of such a weight and at such a depth that the water above the explosion is blown out.

In Figure 3 a charge 12 is shown as having just been exploded at a shallower depth such that the surface is broken immediately by the blow-out 18 occurring above the explosion. Since the gas passes almost instantly to the atmosphere, no cavity to compress and expand, such as is shown at 14 in Figure 1, is formed with the attendant generation of unwanted secondary P waves.

Figure 5:
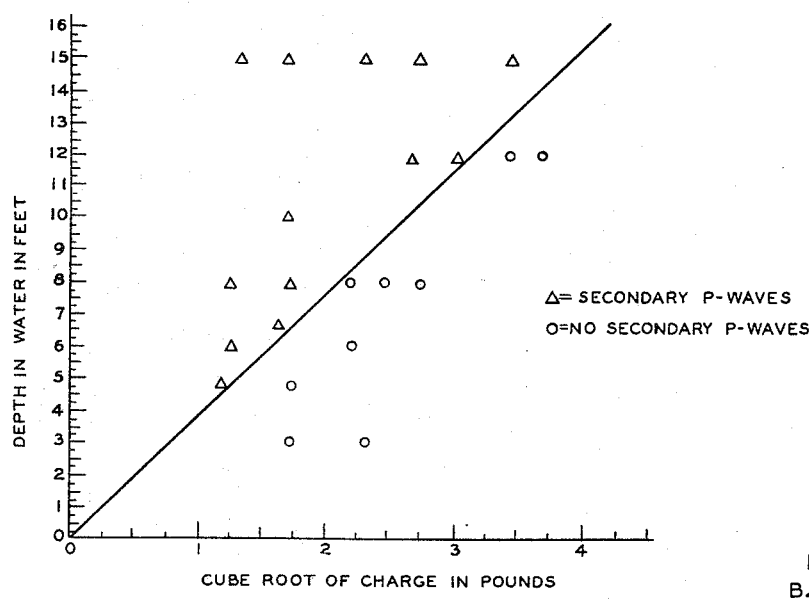
Figure 5 is a curve by means of which the proper depth for any certain charge may be determined.

It has been found that for any given depth it is possible by controlling the size of the charge, to eliminate the secondary advance; or conversely, it is possible to suspend any given size charge at such a depth in the water as to eliminate the secondary P waves. A curve illustrating the results of experimental work is shown in Figure 5. Charges of various weights were fired at various depths and it is to be noted that, by plotting the cube root of the charge in pounds against the depth at which the charge was fired, and then selecting those points at which the depth is just sufficient to permit a blow-out to occur, a straight line results. If the charge is of such weight and the depth to which it is placed is such as to fall on or above the line, secondary P waves will result, whereas if the charge and depth are such that the point will fall below the line a cavity will be created sufficiently large to break the surface and blow out the water above the explosion and no secondary P waves will result. For example, using a eight pound charge (cube root 2) and suspending it at some distance less than 7.6 feet below the surface of the water no secondary P waves result. Again, using a 27 pound charge (cube root 3), it would be possible to lower and explode it at a depth of as much as 11.4 feet without creating secondary P waves. Naturally it is desirable to lower the charge to as great a depth as possible without creating secondary P waves since the greater the depth the more energy is received back in the returning waves.

The equation for the line of the curve in Figure 5 can easily be determined to be:

$$y = 3.8x$$

where
$y$ = depth of water in ft.
$x$ = cube root of charge in lbs.

Thus, when the depth in feet equals or is slightly less than 3.8 times the cube root of the weight of the charge in pounds, secondary P waves will not result while at the same time the maximum energy of the shot will be utilized.

The nature and strength of the explosive used will, of course, affect the depth to which it should be placed. The curve of Figure 5 and its equation $$y = 3.8x$$

was arrived at using 60% straight gelatin dynamite. A charge of a certain weight of a stronger explosive will naturally have to be placed at a greater depth than the same weight of 60% straight gelatin dynamite, while the same weight of a weaker explosive should be placed at a shallower depth. A curve plotted for 100% straight gelatin dynamite will be represented by the equation $$y = 4.31x$$

and a curve for 30% straight gelatin dynamite will be represented by the equation $$y = 3.44x$$

Figure 4:
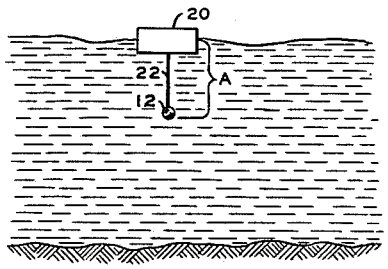
Figure 4 shows a charge suspended from a suitable float.

In Figure 4 the charge 12 is shown as suspended from a buoyant member 20 by means of a suitable wire or cord 22, the depth of which is indicated at "$a$". Any suitable float may be used as long as it is capable of supporting the charge of a desired weight. Closed, empty tin cans of about five quart capacity have been found to be very satisfactory.

Obviously many modifications and variations of the invention, as hereinbefore set forth, may be made without departing from the spirit and scope thereof, but only such limitations should be imposed as are indicated in the appended claims.

We claim:

1. In the process of seismic exploration in which the firing of a charge of explosive placed below the surface of a body of water is used to generate seismic waves, the method of preventing the occurrence of secondary P waves when the charge is exploded which comprises correlating the amount of the charge, the strength of the explosive, and the depth of the charge in the body of water so that the explosive force of the charge when fired is just sufficient to blow out the water above the exploding charge, placing the charge of explosive at the predetermined depth, and firing the charge to generate seismic waves.

2. In the process of seismic exploration wherein the explosion of a charge of 60% straight gelatin dynamite in a body of water is used to generate seismic waves, the step of firing the charge at a depth in feet equal to substantially 3.8 times the cube root of the weight of the charge in pounds so that the explosion will cause the water above the charge to "blow-out."

3. In the process of seismic exploration wherein the firing of a charge of explosive in a body of water is used to generate seismic waves, the method of preventing the occurrence of secondary P waves when the charge is exploded which comprises determining the depths at which various given amounts of the desired explosive will be just sufficient to cause a blow-out of the water above the charge, recording the data so obtained, determining from said data the depth at which a desired amount of said explosive, when fired, will be just sufficient to cause a blow-out of water above the charge, placing the desired amount of the explosive at the depth so determined, and firing the explosive to generate seismic waves.

ROY LIVINGSTON LAY.
BERNHARDT HENRY TREYBIG, JR.
LAURENCE MEADE HUBBY.